US006666054B1

(12) United States Patent
Hsieh

(10) Patent No.: US 6,666,054 B1
(45) Date of Patent: Dec. 23, 2003

(54) REMOTE-CONTROLLED DOOR LOCK

(76) Inventor: Hui-Hua Hsieh, P.O. Box 90, Tainan City (TW)

( * ) Notice: Subject to any disclaimer, the term of this patent is extended or adjusted under 35 U.S.C. 154(b) by 0 days.

(21) Appl. No.: 10/202,665

(22) Filed: Jul. 25, 2002

(51) Int. Cl.[7] .................................................. B60R 25/04

(52) U.S. Cl. .......................... 70/257; 70/277; 70/279.1; 70/278.7; 292/144

(58) Field of Search .......................... 70/107, 257, 277, 70/279.1, 278.7, 283; 292/144

(56) References Cited

U.S. PATENT DOCUMENTS

| | | | | |
|---|---|---|---|---|
| 2,765,648 A | * 10/1956 | Hatcher | 70/264 |
| 4,784,415 A | * 11/1988 | Malaval | 292/144 |
| 5,216,909 A | * 6/1993 | Armoogam | 70/278 |
| 5,531,086 A | * 7/1996 | Bryant | 70/279.1 |
| 5,588,318 A | * 12/1996 | Osborne | 292/144 X |
| 5,636,536 A | * 6/1997 | Kinnucan | 70/107 |
| 5,790,034 A | * 8/1998 | Khoury | 70/277 X |
| 5,943,888 A | * 8/1999 | Lawson | 70/278 |
| 6,462,431 B1 | * 10/2002 | Woo | 70/277 X |

* cited by examiner

*Primary Examiner*—Suzanne Dino Barrett

(57) ABSTRACT

A remote-controlled door lock has a case body provided with a battery base, a circuit board and a braking device therein. A latch-bolt assembly has a through hole and a slide slot extending from the through hole and having a width smaller than a retaining member. When the circuit board receives a locking sign from a remote controller, it actuates a motor of the braking device to turn a driving gear to rotate a gear rack of a slide block to move a retaining member upwards to be engaged with the through hole without moving into the slide slot to restrict the latch-bolt assembly in a locked position, whereby even though dead bolts of a lock base are unlocked, the door lock cannot be completely unlocked without using the remote controller to actuate the braking device to relieve the latch-bolt assembly from being locked, thus achieving a best effect of anti-theft.

1 Claim, 8 Drawing Sheets

REMOTE-CONTROLLED DOOR LOCK

BACKGROUND OF THE INVENTION

1. Field of the Invention

This invention relates to a remote-controlled door lock, particularly to one provided with a braking device capable of being controlled by a remote controller to restrict a latch-bolt assembly in a locked position. When a circuit board receives a locking sign from the remote controller, the circuit board will actuate a motor of the braking device to turn a driving gear to rotate a gear rack of a slide block that is meshed with the driving gear to move a retaining member that is disposed at a bottom of the slide block upwards to be engaged with a through hole of the latch-bolt assembly without moving into a slide slot that extends from the through hole and has a width smaller than a diameter of the retaining member so as to restrict the latch-bolt assembly in a locked position, whereby even though dead bolts of a lock base are unlocked, the door lock cannot be completely unlocked without using the remote controller to actuate the braking device to relieve the latch-bolt assembly from being locked, thus achieving a best effect of anti-theft.

2. Description of the Prior Art

A conventional key-operated door lock, as shown in FIG. 1, includes a case body 10 provided with a lock base 11, a pull plate 12 and a latch-bolt assembly 13 disposed therein. The lock base 11 has dead bolts 110 provided at one side thereof and capable of extending out of through holes 100 formed in a sidewall of the case body 10. The lock base 11 further has two lock cores 111 respectively disposed in an inner and an outer sides thereof and each provided with a keyhole 112. The pull plate 12 is disposed in the outer side of the case body 10 and has a fixing plate 120 extending into a slide groove 101 of the case body 10 and attached relatively to a fixing plate 102 of the case body 10. One end of the latch-bolt assembly 13 extends through the fixing plate 102 of the case body 10 to be secured to the fixing plate 120 of the pull plate 12. A spring 130 is sleeved on the latch-bolt assembly 13 adjacent to the end thereof. The other end of the latch-bolt assembly 13 is provided with a stop member 131 capable of extending out of a through hole 103 formed at the sidewall of the case body 10. When a key is inserted in the keyhole 112 of one of the lock cores 111 to turn, the dead bolts 110 and the stop member 131 will move back into the case body 10, thus unlocking the conventional key-operated door lock.

However, such a conventional key-operated door lock only using a key to lock the dead bolts 110 can be easily pried unlocked by thefts with simple picking tools or special tools, thus losing the anti-theft function.

SUMMARY OF THE INVENTION

The main purpose of the invention is to offer a remote-controlled door lock having a best effect of anti-theft.

The main feature of the invention is to provide a case body having a battery base, a circuit board and a braking device disposed therein, the braking device located above a latch-bolt assembly and having a fixed base, two slide rails disposed in the fixed base, a motor disposed at an outer sidewall of the fixed base and having a shaft with one end extending into the fixed base, a driving gear disposed on the end of the shaft of the motor, a slide block disposed in the fixed base and having one end placed between the two slide rails and the other end provided with an inner surface formed as a gear rack capable of being meshed with the driving gear, a connecting rod fixed at a bottom of the slide block and having a retaining member disposed at a lower end thereof; and, a latch-bolt assembly having a through hole formed thereon, and a slide slot extending from the through hole and having a width smaller than a diameter of the retaining member.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
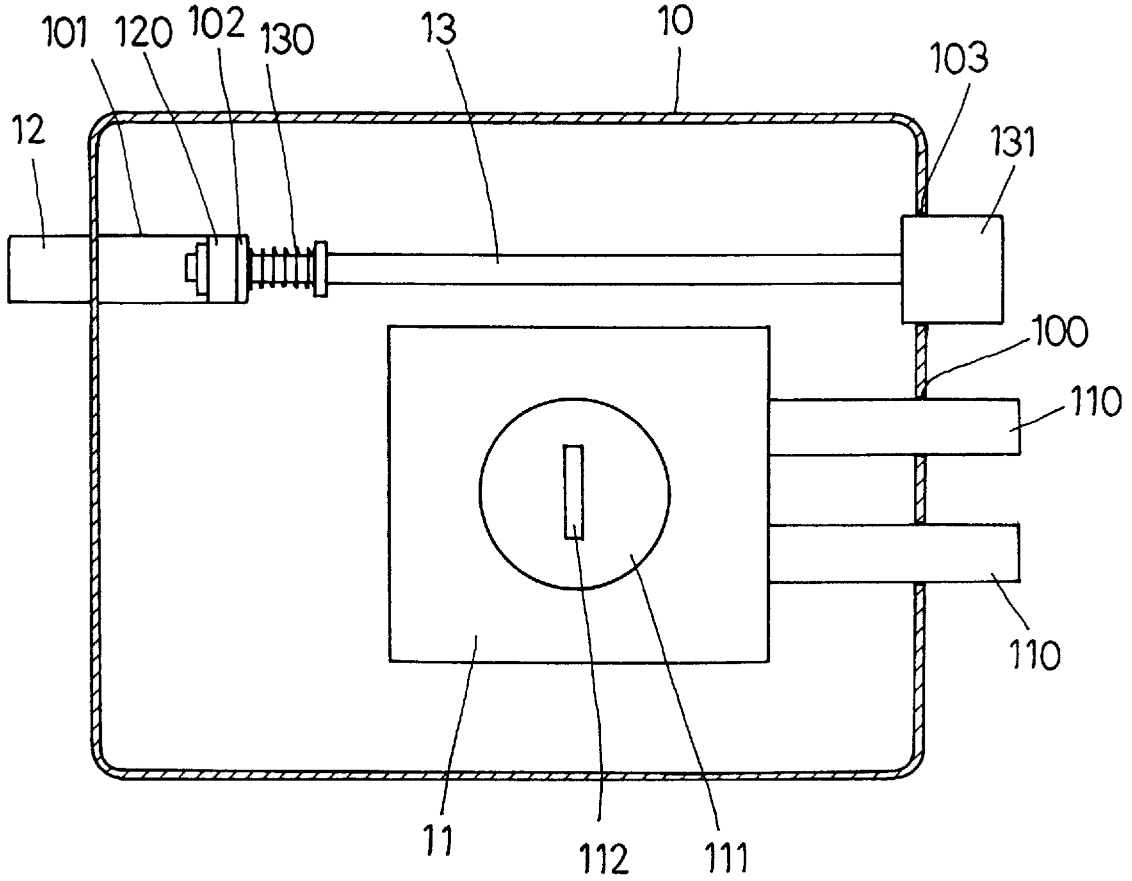
FIG.1 (PRIOR ART)
FIG. 1 is a schematic sectional view of a conventional door lock.
Figure 2:
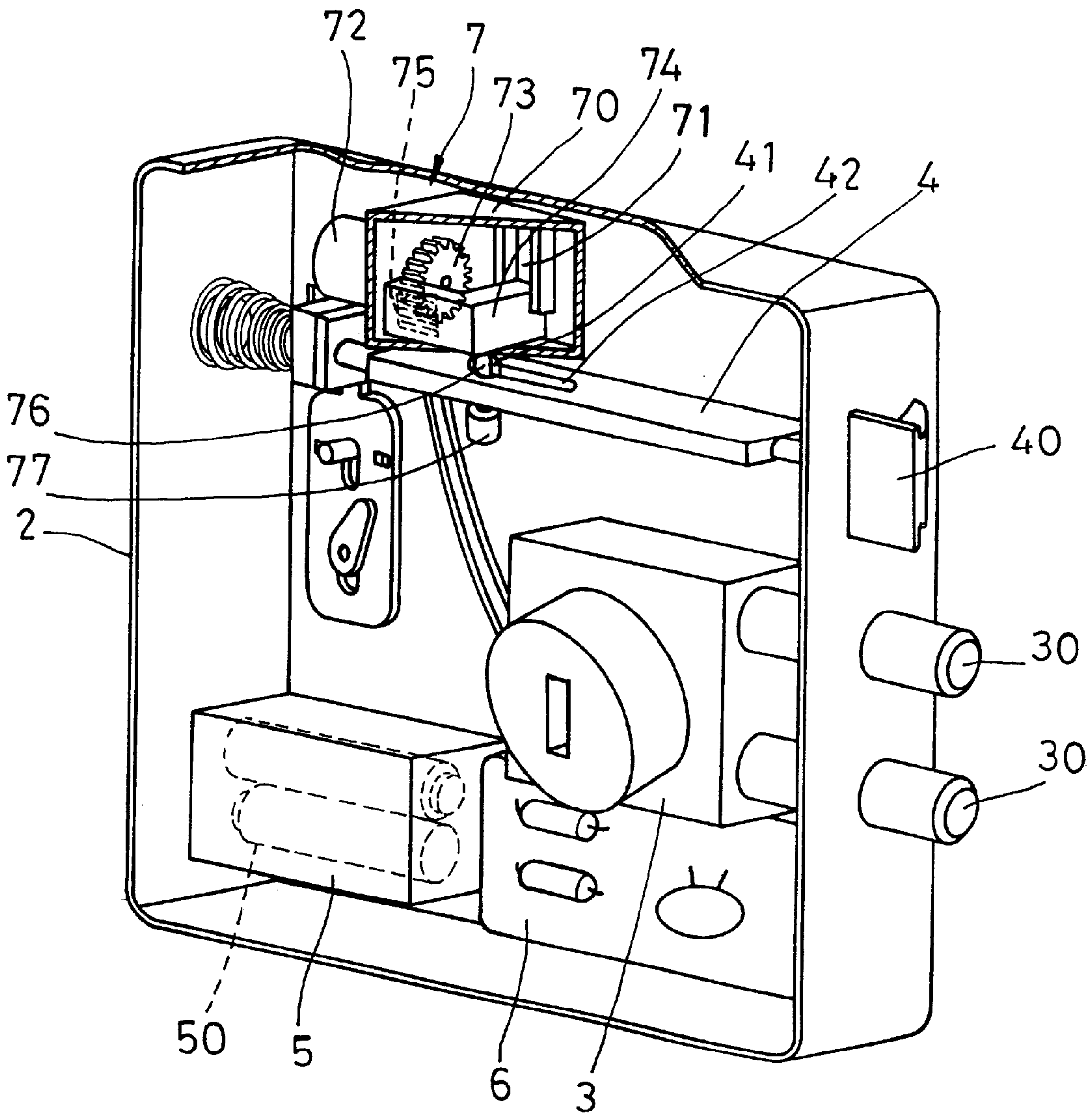
FIG. 2 is a perspective view of a first preferred embodiment of a remote-controlled door lock in the present invention.
Figure 3:
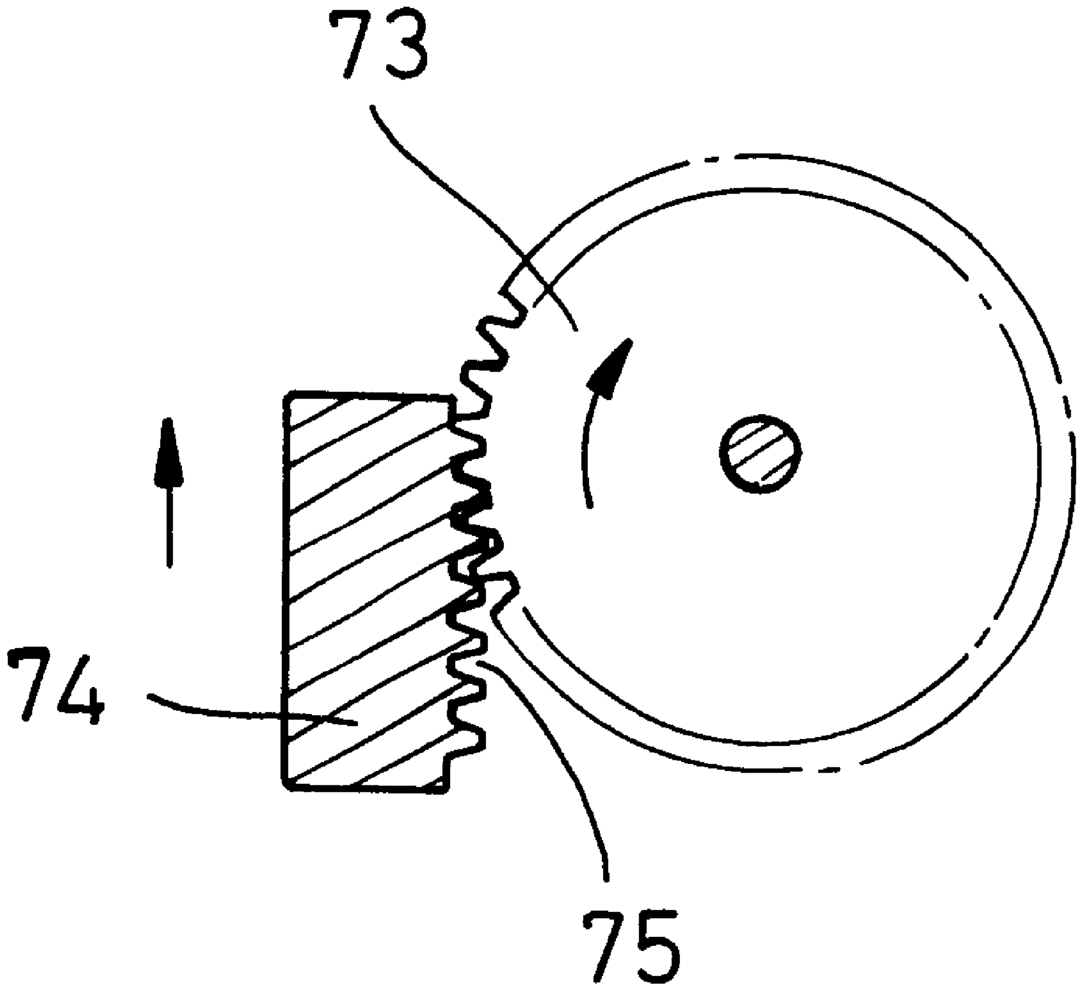
FIG. 3 is a sectional view of the remote-controlled door lock in the present invention, showing a driving gear meshed with a gear rack of a slide block.

A first preferred embodiment of a remote-controlled door lock in the present invention, as shown in FIGS. 2 and 3, mainly includes a case body 2 provided with a lock base 3, a latch-bolt assembly 4, a battery base 5, a circuit board 6, and a braking device 7 therein.

The lock base 3 has two dead bolts 30 capable of extending out of a sidewall of the case body 2.

The latch-bolt assembly 4 has an engagement block 40 disposed at one end thereof and capable of extending out of the sidewall of the case body 2, a through hole 41 formed thereon, and a slide slot 42 extending from the through hole 41 and having a smaller width.

The battery base 5 can accommodate batteries 50 therein.

The braking device 7 located above the latch-bolt assembly 4 has a fixed base 70, two slide rails 71 disposed in the fixed base 70, a motor 72 disposed at an outer sidewall of the fixed base 70 and having a shaft with one end extending into the fixed base 70, a driving gear 73 disposed on the end of the shaft of the motor 72, a L-shaped slide block 74 disposed in the fixed base 70 and having one end placed between the two slide rails 71 and the other end provided with an inner surface formed as a gear rack 75 capable of being meshed with the driving gear 73 (as shown in FIG. 3), a connecting rod 76 fixed at a bottom of the slide block 74 and having a retaining member 77 disposed at a lower end thereof and having a diameter larger than the width of the a slide slot 42 of the latch-bolt assembly 4.

Figure 4:
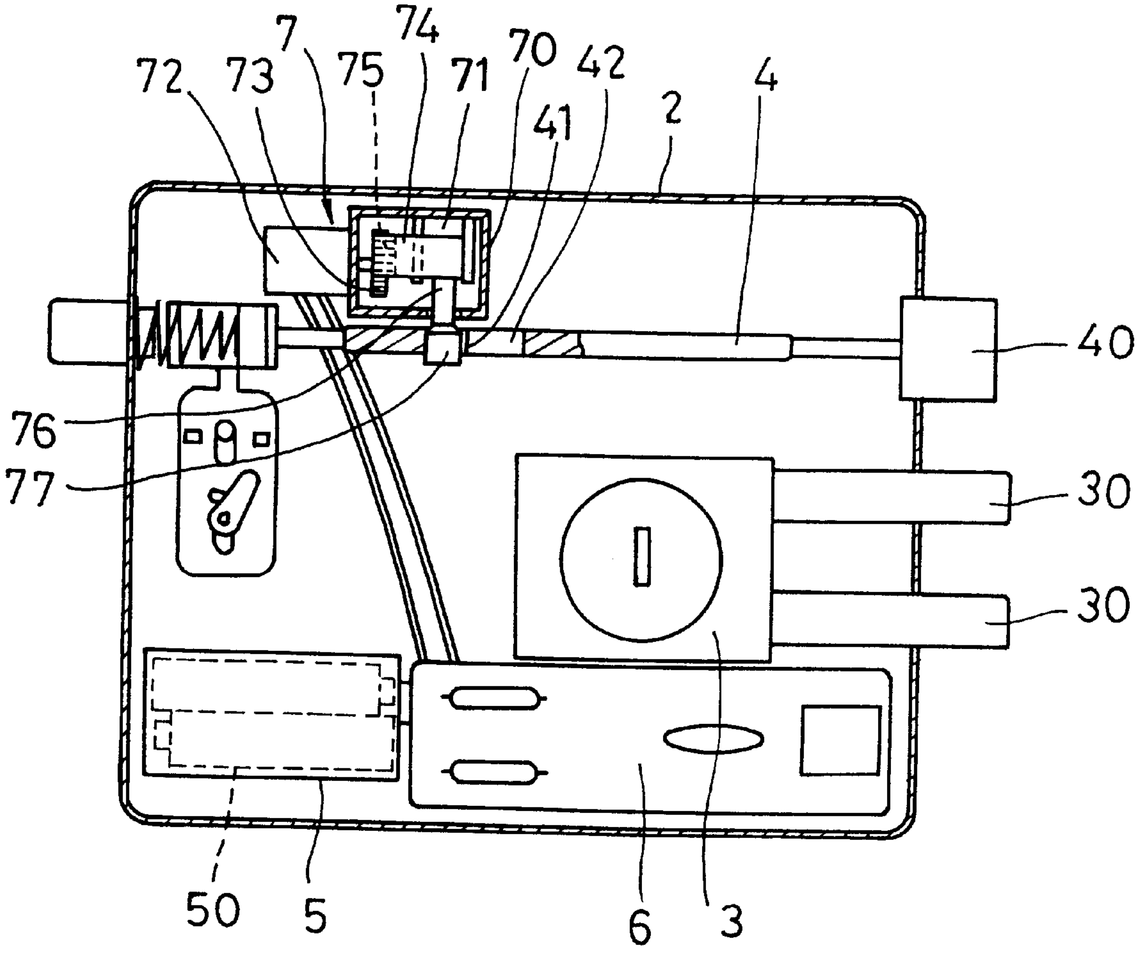
FIG. 4 is a schematic sectional view of the first preferred embodiment of the remote-controlled door lock in the present invention being in a locked status.

In locking, as shown in FIG. 4, firstly, insert a key (not shown) into the lock base 3 to turn and move the dead bolts 30 of the lock base 3 outwards to be inserted into and engaged with an engagement hole of a doorframe (not shown), by which a common locking movement is completed. Secondly, press down a locking button of a remote controller (not shown) to send a locking sign to the circuit board 6 to actuate the motor 72 of the braking device 7 to turn the driving gear 73 clockwise to rotate the gear rack 75 of the slide block 74 that is meshed with the driving gear 73 to move the slide block 74 upwards so that the retaining member 77 of the connection rod 76 will follow the upward movement of the slide block 74 to be inserted into and engaged with the through hole 41 of the latch-bolt assembly 4 and is limited in the through hole 41 without moving into the slide slot 42 because the width of the slide slot 42 is smaller than the diameter of the retaining member 77 so as to restrict the latch-bolt assembly 4 in a locked position without moving back into the case body 2, by which even though the dead bolts 30 of the lock base 3 are unlocked by the key, the door lock of the present invention is still unable to be completely unlocked without using the remote controller to actuate the braking device 7 to relieve the latch-bolt assembly 4 from being locked, thus achieving a best effect of anti-theft.

Figure 5:
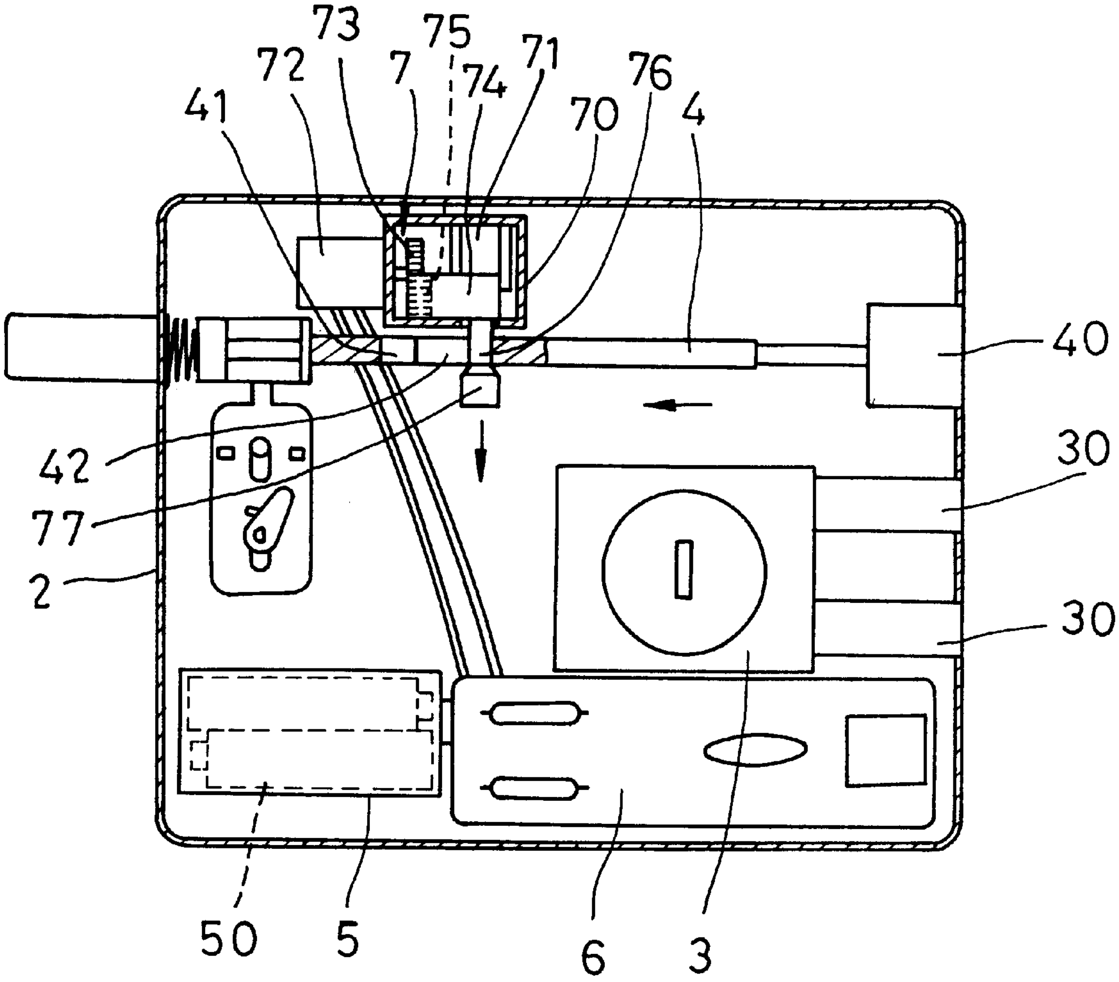
FIG. 5 is a schematic sectional view of the first preferred embodiment of the remote-controlled door lock in the present invention being in an unlocked status.

In unlocking, as shown in FIG. 5, firstly, press down an unlocking button of the remote controller to send an unlocking sign to the circuit board 6 to actuate the motor 72 of the braking device 7 to turn the driving gear 73 counterclockwise to rotate the gear rack 75 of the slide block 74 that is meshed with the driving gear 73 to move the slide block 74 downwards so that the retaining member 77 will follow the downward movement of the slide block 74 to be disengaged from the through hole 41 of the latch-bolt assembly 4, and the connecting rod 76 will be remained in the through hole 41 and can slide into the slide slot 42 because the diameter of the connecting rod 76 is smaller than the width of he slide slot 42, by which the latch-bolt assembly 4 can move back into the case body 2. Secondly, insert the key into the lock base 3 to turn and move the dead bolts 30 of the lock base 3 inwards to be disengaged from the engagement hole of the doorframe, by which the unlocking movement of the door lock of the present invention is completed.

Figure 6:
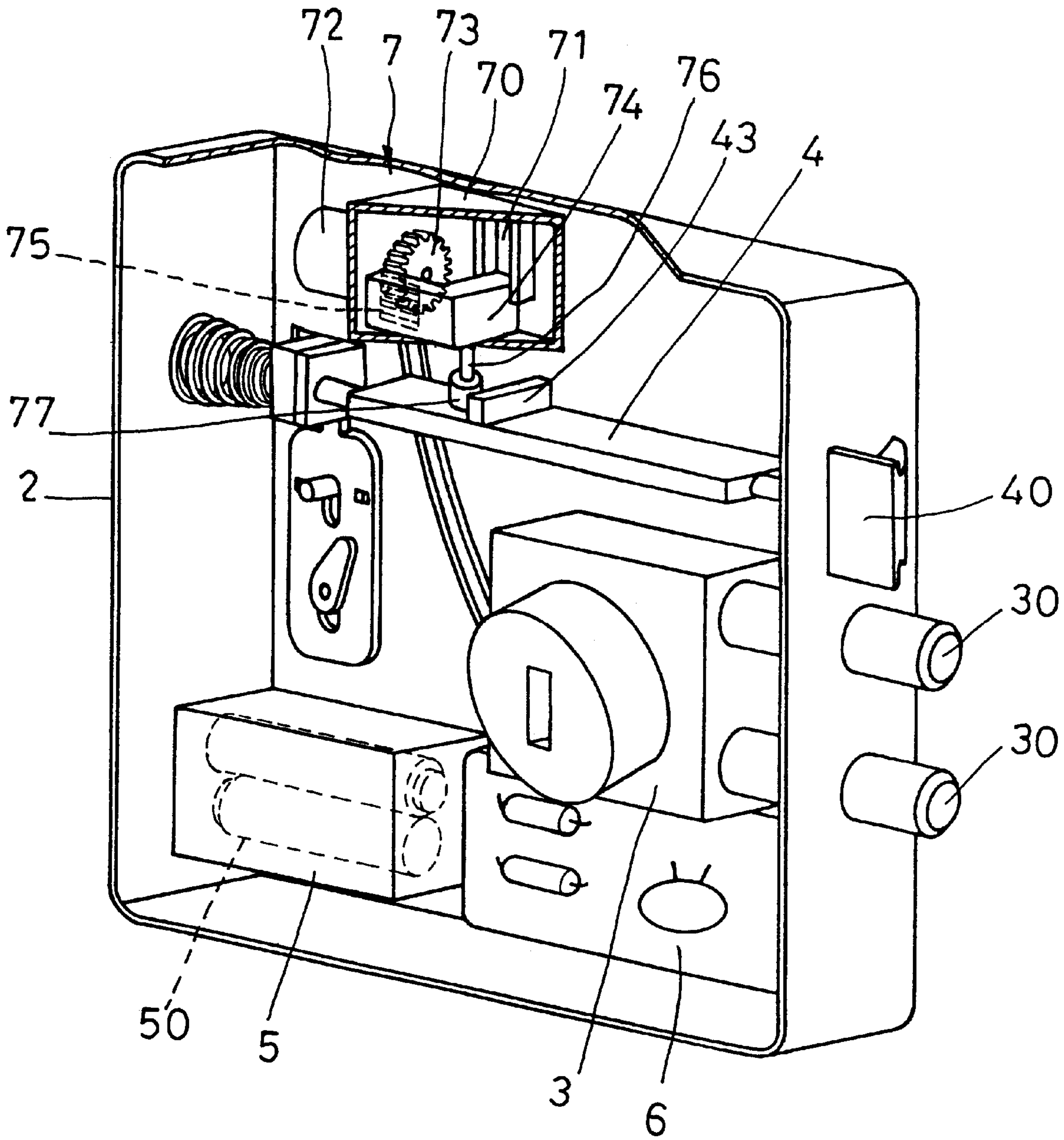
FIG. 6 is a perspective view of a second preferred embodiment of the remote-controlled door lock in the present invention.

Moreover, a second preferred embodiment of the remote-controlled door lock in the present invention, as shown in FIG. 6, mainly has a stop plate 43 instead of the through hole 41 and the slide slot 42 of the latch-bolt assembly 4 to be designed as a stop plate 43. The stop plate 43 is disposed on the latch-bolt assembly 4 and for being stopped by the retaining member 77 of the braking device 7.

Figure 7:
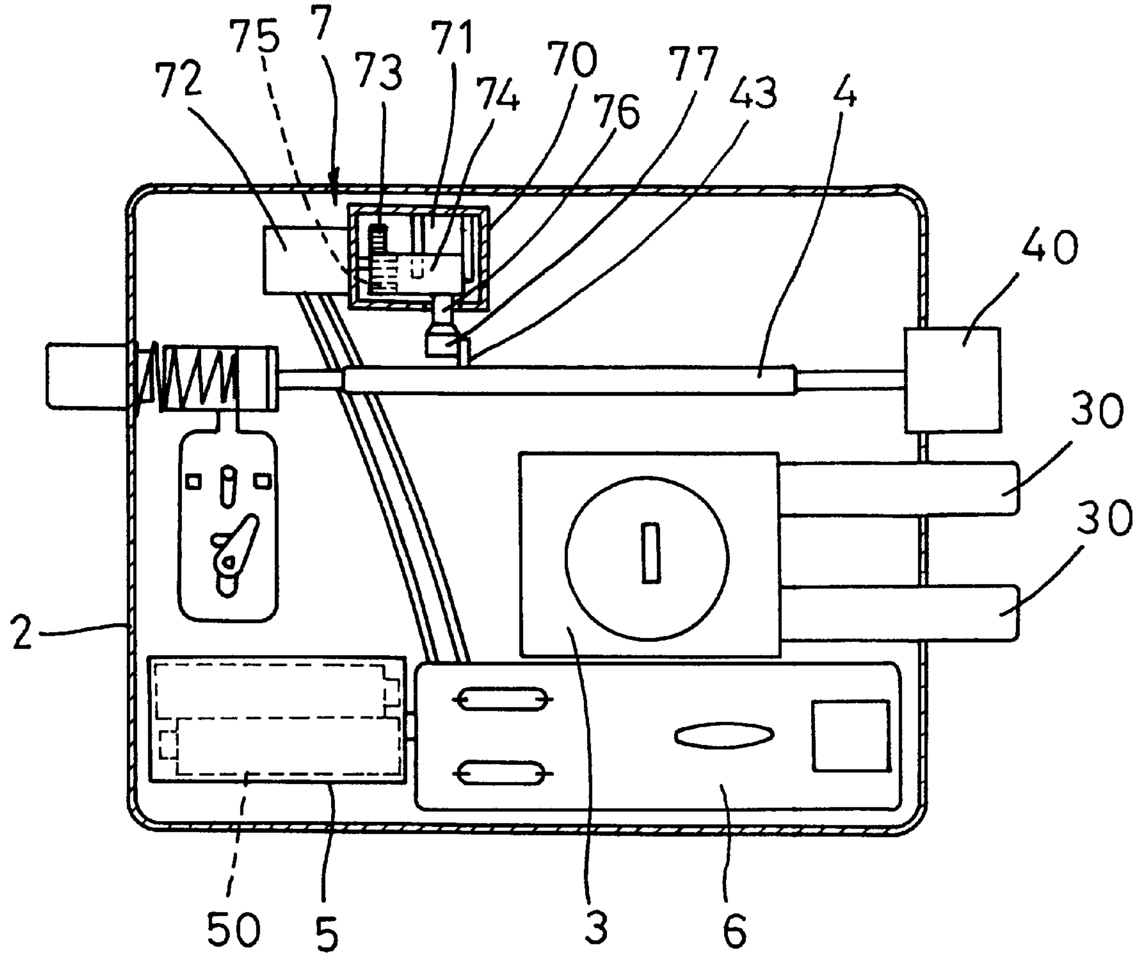
FIG. 7 is a schematic sectional view of the second preferred embodiment of the remote-controlled door lock in the present invention being in a locked status; and, FIG. 8 is a schematic sectional view of the second preferred embodiment of the remote-controlled door lock in the present invention being in an unlocked status.

In locking, as shown in FIG. 7, firstly, insert the key into the lock base 3 to turn and move the dead bolts 30 of the lock base 3 outwards to be inserted into and engaged with the engagement hole of the doorframe, by which a common locking movement is completed. Secondly, press down the locking button of the remote controller to send a locking sign to the circuit board 6 to actuate the motor 72 of the braking device 7 to turn the driving gear 73 counterclockwise to rotate the gear rack 75 of the slide block 74 that is meshed with the driving gear 73 to move the slide block 74 downwards so that the retaining member 77 of the connecting rod 76 will follow the downward movement of the slide block 74 to be located behind the stop plate 43 of the latch-bolt assembly 4 to stop the latch-bolt assembly 4 so as to restrict the latch-bolt assembly 4 in a locked position without moving back into the case body 2, by which even though the dead bolts 30 of the lock base 3 are unlocked by the key, the door lock of the present invention is still unable to be completely unlocked without using the remote controller to actuate the braking device 7 to relieve the latch-bolt assembly 4 from being locked, thus achieving a best effect of anti-theft.

Figure 8:
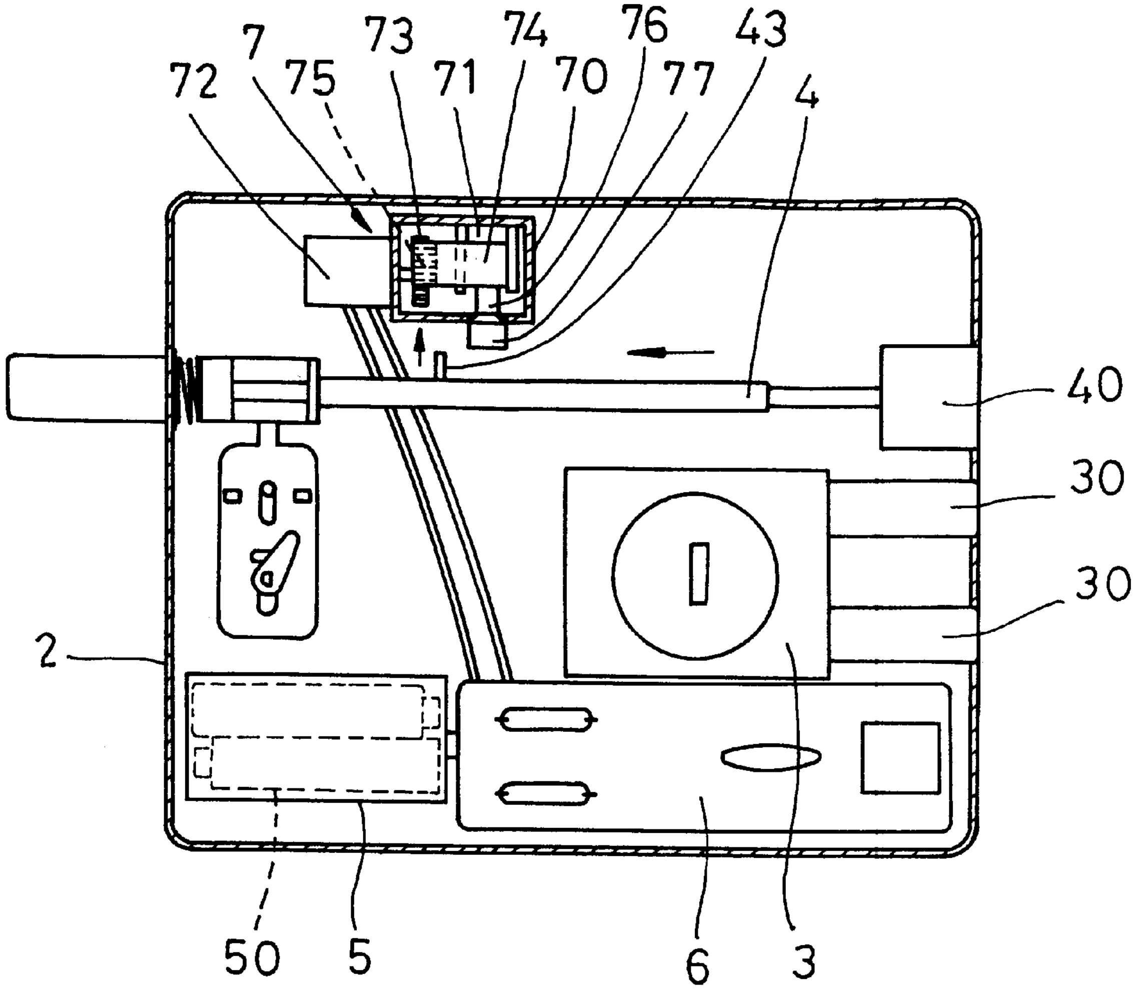

In unlocking, as shown in FIG. 8, firstly, press down an unlocking button of the remote controller to send an unlocking sign to the circuit board 6 to actuate the motor 72 of the braking device 7 to turn the driving gear 73 clockwise to rotate the gear rack 75 of the slide block 74 that is meshed with the driving gear 73 to move the slide block 74 upwards so that the retaining member 77 will move upward by following the upward movement of the slide block 74 so as not to stop the stop plate 43 of the latch-bolt assembly 4, any more and allow the latch-bolt assembly 4 to move back into the case body 2. Secondly, insert the key into the lock base 3 to turn and move the dead bolts 30 of the lock base 3 inwards to be disengaged from the engagement hole of the doorframe, by which the unlocking movement of the door lock is completed.

While the preferred embodiment of the invention has been described above, it will be recognized and understood that various modifications may be made therein and the appended claims are intended to cover all such modifications that may fall within the spirit and scope of the invention.

What is claimed is:

1. A remote-controlled door lock comprising:

a case body having a lock base and a latch-bolt assembly disposed therein, said lock base having at least one dead bolt capable of extending out of a sidewall of said case body, said latch-bolt assembly having an engagement block disposed at one end thereof and capable of extending out of said sidewall of said case body; and, characterized by a case body further having a battery base, a circuit board and a braking device disposed therein, said braking device located above a latch-bolt assembly and having a fixed base, two slide rails disposed in said fixed base, a motor disposed at an outer sidewall of said fixed base and having a shaft with one end extending into said fixed base, a driving gear disposed on said end of said shaft of said motor, a slide block disposed in said fixed base and having one end placed between said slide rails and the other end provided with an inner surface formed as a gear rack capable of being meshed with said driving gear, a connecting rod fixed at a bottom of said slide block and having a retaining member disposed at a lower end thereof;

said latch-bolt assembly further having a through hole formed thereon, and a slide slot extending from said through hole and having a width smaller than a diameter of said retaining member; and, whereby when said circuit board receives a locking sign from a remote controller, said circuit board will actuate said motor of said braking device to turn said driving gear to rotate said gear rack of said slide block that is meshed with said driving gear to move said slide block upwards so that said retaining member of said connection rod will follow the upward movement of said slide block to be inserted into and engaged with said through hole of said latch-bolt assembly and is limited in said through hole without moving into said slide slot because said width of said slide slot is smaller than said diameter of said retaining member so as to restrict said latch-bolt assembly in a locked position without moving back into said case body, by which even though said dead bolts of said lock base are unlocked by a key or the like, said door lock is still unable to be completely unlocked without using said remote controller to actuate said braking device to relieve said latch-bolt assembly from being locked, thus achieving a best effect of anti-theft.

* * * * *